United States Patent
Kobayashi et al.

(10) Patent No.: US 8,818,355 B2
(45) Date of Patent: Aug. 26, 2014

(54) WIRELESS CELL MONITORING METHOD, ITS DEVICE, AND ITS PROGRAM

(75) Inventors: Kosei Kobayashi, Tokyo (JP); Yasuhiko Matsunaga, Tokyo (JP)

(73) Assignee: NEC Corporation, Tokyo (JP)

(*) Notice: Subject to any disclaimer, the term of this patent is extended or adjusted under 35 U.S.C. 154(b) by 682 days.

(21) Appl. No.: 12/531,103

(22) PCT Filed: Feb. 26, 2008

(86) PCT No.: PCT/JP2008/053250
§ 371 (c)(1),
(2), (4) Date: Sep. 14, 2009

(87) PCT Pub. No.: WO2008/114578
PCT Pub. Date: Sep. 25, 2008

(65) Prior Publication Data
US 2010/0093338 A1    Apr. 15, 2010

(30) Foreign Application Priority Data
Mar. 19, 2007   (JP) .................................. 2007-070620

(51) Int. Cl.
*H04W 24/08*   (2009.01)
(52) U.S. Cl.
USPC ............................ 455/423; 455/424; 455/436
(58) Field of Classification Search
USPC .............. 455/423–426, 115, 226, 456.1–457; 379/1.01–35
See application file for complete search history.

(56) References Cited

U.S. PATENT DOCUMENTS

2007/0066298 A1*   3/2007   Hurst ........................... 455/423

FOREIGN PATENT DOCUMENTS

| JP | 2006094497 A | 4/2006 |
|----|--------------|--------|
| JP | 2006238306 A | 9/2006 |
| JP | 2006262403 A | 9/2006 |
| JP | 2006340050 A | 12/2006 |

OTHER PUBLICATIONS

International Search Report for PCT/JP2008/053250 mailed Jun. 3, 2008.

* cited by examiner

*Primary Examiner* — Kashif Siddiqui
(74) *Attorney, Agent, or Firm* — Sughrue Mion, PLLC

(57) ABSTRACT

In a wireless cell, the potential deterioration in quality is efficiently detected when the indication of abnormalities is weak. Provided are a step of calculating one or more radio qualities for each coverage area of a wireless cell; a step of measuring one or more network statistical qualities for each coverage area of the wireless cell; a step of making a pair of each network statistical quality and one or more radio qualities for each coverage area of each wireless cell; and a step of calculating, based on the pairs of each network statistical quality and one or more radio qualities for the coverage areas of the wireless cells, the correlation between each network statistical quality and one or more radio qualities.

27 Claims, 15 Drawing Sheets

FIG. 3

| WIRELESS BASE STATION IDENTIFICATION INFORMATION | LONGITUDE | LATITUDE | HEIGHT OF ANTENNA | ANGLE OF ANTENNA (tilt) | ANGLE OF ANTENNA (pan) | TRANSMISSION POWER | WIRELESS BASE STATION INSTALLATION LOCATION |
|---|---|---|---|---|---|---|---|
| A | x | y | h | d1 | d2 | p | SUBURBAN |
| B | : | : | : | : | : | : | SUBWAY |
| C | : | : | : | : | : | : | INSIDE BUILDING (GROUND FLOOR OF N BUILDING) |
| D | : | : | : | : | : | : | INSIDE BUILDING (SECOND FLOOR OF N BUILDING) |

FIG. 5

| WIRELESS CELL IDENTIFICATION INFORMATION | CALL SETUP SUCCESS RATE (MEASURED VALUE) | HANDOVER SUCCESS RATE (MEASURED VALUE) |
|---|---|---|
| A | 86% | 90% |
| B | 84% | 86% |
| C | 54% | 49% |
| D | 90% | 93% |
| E | 61% | 58% |

FIG. 6

| WIRELESS CELL IDENTIFICATION INFORMATION | STRONG SIGNAL AREA RATIO | AVERAGE AMOUNT OF RADIO INTERFERENCE |
|---|---|---|
| A | 86% | -7.5dB |
| B | 92% | -8.0dB |
| C | 52% | -9.0dB |
| D | 99% | -6.0dB |
| E | 62% | -8.0dB |

FIG. 10

| WIRELESS CELL IDENTIFICATION INFORMATION | STRONG SIGNAL AREA RATIO | CALL SETUP SUCCESS RATE (REFERENCE VALUE) | CALL SETUP SUCCESS RATE (MEASURED VALUE) | DEGREE OF QUALITY ABNORMALITY |
|---|---|---|---|---|
| A | 86% | 88% | 86% | 0.3 |
| B | 92% | 95% | 84% | 3.0 |
| C | 52% | 54% | 54% | 0 |
| D | 98% | 98% | 90% | 2.6 |
| E | 62% | 60% | 61% | 0 |

WIRELESS CELL MONITORING METHOD, ITS DEVICE, AND ITS PROGRAM

The present application is the National Phase of PCT/JP2008/053250, filed Feb. 26, 2008, which is based on and claims priority from Japanese Patent Application No. 2007-070620 (filed on Mar. 19, 2007), the entire content of which being incorporated herein by reference.

TECHNICAL FIELD

The present invention relates to a method for monitoring a wireless cell in a mobile communication network based on a cellular communication system, a device thereof and a program thereof, and particularly relates to a wireless cell monitoring method, a device thereof and a program thereof which monitor the potential deterioration in quality of the wireless cell using both network planning information and network statistical quality.

BACKGROUND ART

In the mobile communication network, communication quality is generally monitored based on an indicator (quality indicator) of the network statistical quality acquired from a communication device. For example, the quality indicator includes a call setup success rate, which represents the number of calls successfully set up with respect to the number of requests for setting up a call which occurs when a mobile terminal makes or receives a call, a handover success rate, which represents the number of handover operations successfully performed with respect to the number of requests for handover, and the like. Each mobile carrier uses a combination of the indicators. A network administrator checks the quality indicators and the output of a failure detection mechanism incorporated into the hardware or software of each communication device, thereby making it possible to carry out comprehensive quality and failure management. The general method to detect abnormalities of a network from the quality indicators is to compare the quality indicators with predetermined reference values which are preset for respective quality indicators. One of the conventional methods to set the reference values for respective quality indicators is to use a statistical average value of the past quality indicators (See PTL 1). That is, a statistical average value of the quality indicators during a predetermined period of time in the past when it was assumed that a communication network was normal is regarded as a reference value, the difference between the reference value and the actually measured value is calculated, and it is determined that abnormalities have occurred when the difference exceeds a predetermined threshold.

CITATION LIST

{Patent Literature}
{PTL 1} JP-A-2006-094497

SUMMARY OF INVENTION

Technical Problem

The conventional quality monitoring method which uses the statistical average value of the past quality indicators as the reference value is effective in addressing such failures as the malfunction of devices in a network or a wireless base station, which could lead to a steep deterioration in quality. However, when quality is constantly low, or when the indication of abnormalities is weak due to a gradual deterioration in quality, it is difficult to detect potential quality abnormalities. That is, if the difference with respect to the statistical average value of the past quality indicators cannot be confirmed, even a wireless cell with potential abnormalities cannot be detected. For example, according to the conventional method, it is difficult to detect the following wireless cells because the quality does not deteriorate steeply: a wireless cell which has constantly low quality due to the misconfiguration of the network operation parameters, a wireless cell where the radio propagation environment has gradually changed due to the construction of a large structure, and a wireless cell which cannot sufficiently demonstrate the capability because of the partial malfunction of a communication device.

The present invention has been made in view of the above problems. The objective of the present invention is to provide a wireless cell monitoring method, a system thereof and a program thereof which efficiently detect the potential deterioration in quality when the indication of abnormalities is weak.

Solution to Problem

According to the present invention, provided is a wireless cell monitoring method including: a step of calculating one or more radio qualities for each coverage area of a wireless cell; a step of measuring one or more network statistical qualities for each coverage area of the wireless cell; a step of making a pair of each network statistical quality and one or more radio qualities for each coverage area of each wireless cell; and a step of calculating, based on the pairs of each network statistical quality and one or more radio qualities for the coverage areas of the wireless cells, the correlation between each network statistical quality and one or more radio qualities.

Moreover, according to the present invention, provided is a wireless cell monitoring device including: a unit for calculating one or more radio qualities for each coverage area of a wireless cell; a unit for measuring one or more network statistical qualities for each coverage area of the wireless cell; a unit for making a pair of each network statistical quality and one or more radio qualities for each coverage area of each wireless cell; and a unit for calculating, based on the pairs of each network statistical quality and one or more radio qualities for the coverage areas of the wireless cells, the correlation between each network statistical quality and one or more radio qualities.

Moreover, according to the present invention, provided is a program that causes a computer to function as a wireless cell monitoring device including: a unit for calculating one or more radio qualities for each coverage area of a wireless cell; a unit for measuring one or more network statistical qualities for each coverage area of the wireless cell; a unit for making a pair of each network statistical quality and one or more radio qualities for each coverage area of each wireless cell; and a unit for calculating, based on the pairs of each network statistical quality and one or more radio qualities for the coverage areas of the wireless cells, the correlation between each network statistical quality and one or more radio qualities.

Advantageous Effects of Invention

According to the present invention, the reference value of the network statistical quality is estimated based on the radio quality. Since this reference value is used to analyze the abnormalities in quality of the wireless cell, the abnormalities in quality can be detected even when the network statistical quality does not deteriorate steeply.

BRIEF DESCRIPTION OF DRAWINGS

FIG. 3 An explanatory diagram illustrating an example of wireless base station information kept by the wireless network planning system.

FIG. 5 An explanatory diagram illustrating an example of data in a network statistical quality storage section.

FIG. 6 An explanatory diagram illustrating an example of data in a network planning information storage section.

FIG. 10 An explanatory diagram illustrating an example of what a quality display unit displays.

Figure 1:
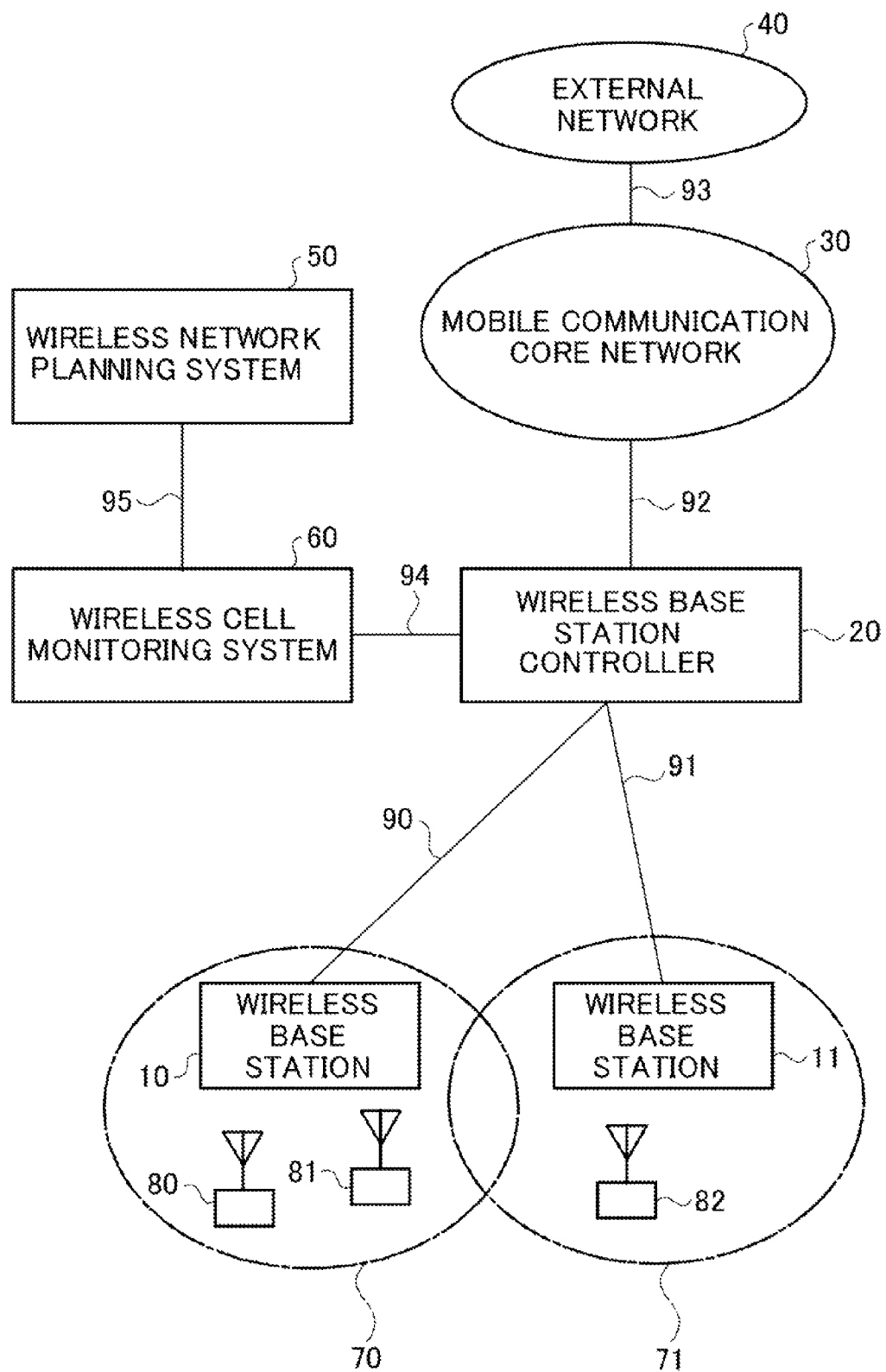
FIG. 1 A diagram illustrating the configuration of a mobile communication network according to a first embodiment of the present invention.

REFERENCE SIGNS LIST 10, 11: Wireless base stations
20: Wireless base station controller
30: Mobile communication core network
40: External network
50: Wireless network planning system
60: Wireless cell monitoring system
61: Wireless cell monitoring system
70, 71: Wireless cells
80 to 82: Mobile terminals
90 to 95: Wired links
600: Network statistical quality collection unit
601: Network statistical quality storage section
602: Network planning information collection unit
603: Radio quality calculation section
604: Network planning information storage section
605: Quality abnormality analysis unit
606: Quality display unit
610: Wireless cell grouping unit

DESCRIPTION OF EMBODIMENTS

First Embodiment

An example of the configuration of a first embodiment of the present invention will be described.

FIG. 1 is a block diagram illustrating an entire mobile communication network according to the first embodiment. As shown in FIG. 1, according to the present embodiment, the mobile communication network includes wireless base stations 10 and 11, a wireless base station controller 20, a mobile communication core network 30, an external network 40, a wireless network planning system 50, and a wireless cell monitoring system 60.

The wireless base stations 10 and 11 respectively form wireless cells 70 and 71 in which radio waves can be transmitted between the wireless base stations and mobile terminals. Mobile terminals 80 and 81 in the wireless cell 70 wirelessly communicate with the wireless base station 10. A mobile terminal 82 in the wireless cell 71 wirelessly communicates with the wireless base station 11.

The wireless base station controller 20 is connected to the wireless base stations 10 and 11 and the mobile communication core network 30 via wired links 90, 91 and 92, respectively, and performs a management process of resources in subordinate wireless cells, a transmitting and receiving process of control traffic and a transferring process of communication traffic. Moreover, the wireless base station controller 20 measures the quality of a communication network and transmits the measurement result to the wireless cell monitoring system 60 as a network statistical quality at regular intervals.

The wireless network planning system 50 is equipped with a radio propagation simulator which estimates the radio quality around each region where each wireless base station is installed, and the like. The wireless network planning system 50 is generally used to determine wireless parameters such as the location of each wireless base station, an antenna power, and a tilting angle of each antenna. The information to be input into the radio propagation simulator includes map information, building information and setting information of the wireless base stations. The radio quality to be estimated includes distribution of the received signal code power (RSCP) representing the received signal strength from the wireless base station, and distribution of the received energy per chip divided by the power density in the band (Ec/N0) representing the amount of radio interference around an arbitrary point in planning areas. FIGS. 2A and 2B show an example of how to hold the estimation result of radio quality. As shown in FIG. 2A, the planning area is divided in a lattice pattern. As shown in FIG. 2B, at each lattice point which is obtained as a result of dividing, the received signal code power (RSCP) and the received energy per chip divided by the power density in the band (Ec/N0) received from each adjacent wireless base station are estimated. Moreover, FIG. 3 shows an example of how to hold wireless base station information. As shown in FIG. 3, longitude and latitude information, the height of an antenna, the angles of an antenna, transmission power, wireless base station installation location information and the like for each wireless base station are associated with wireless base station identification information and are kept. In the wireless network planning system 50, not only the information as shown in FIGS. 2A and 2B but the information as shown in FIG. 3 are kept as the network planning information.

The following describes the wireless cell monitoring system 60 with reference to the accompanying diagrams.

Figure 4:
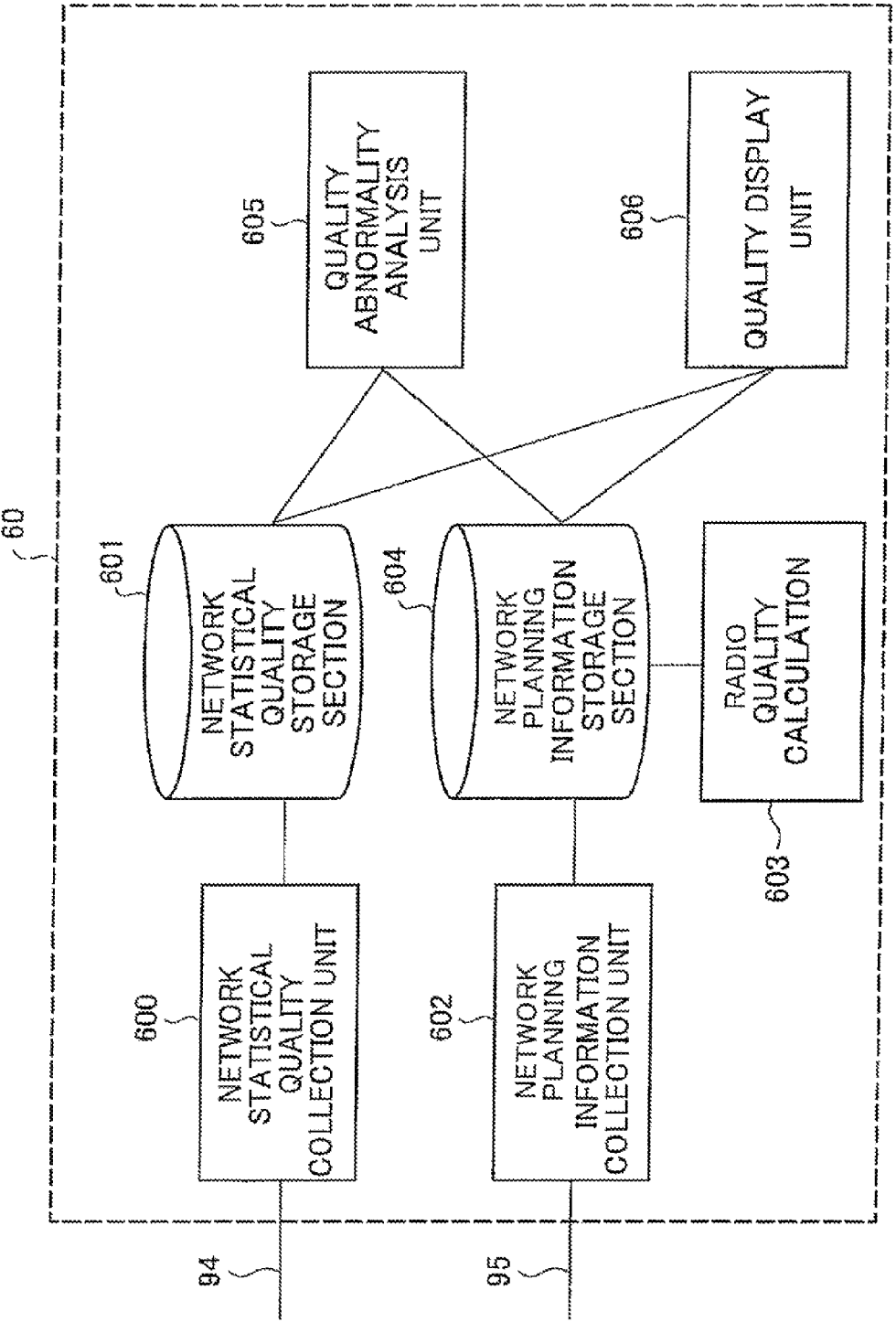
FIG. 4 A diagram illustrating the configuration of a wireless cell monitoring system according to the first embodiment.

FIG. 4 is a block diagram illustrating an example of the configuration of the wireless cell monitoring system 60. The wireless cell monitoring system 60 monitors, based on the reference value of the network statistical quality which is statistically estimated based on the radio quality, the potential abnormalities in quality of the wireless cells. The wireless network planning system 50 and the wireless cell monitoring system 60 are not necessarily connected to each other through wired links, as long as a means has been prepared for transferring network planning information from the wireless network planning system 50 to the wireless cell monitoring system 60.

A network statistical quality collection unit 600 collects an measured value of the network statistical quality from the wireless base station controller 20 via the wired link 94 at regular intervals. The collected information is stored in a network statistical quality storage section 601.

The network statistical quality storage section 601 stores the measured value of the network statistical quality collected by the network statistical quality collection unit 600. As illustrated in FIG. 5, wireless cell identification information and the measured value of the network statistical quality associated with the wireless cell identification information are stored.

A network planning information collection unit 602 collects the network planning information from the wireless network planning system 50 via the wired link 95. The collected information is stored in a network planning information storage section 604.

Moreover, a radio quality calculation unit 603 reads out the network planning information from the network planning information storage section 604, and calculates the radio quality for each wireless cell. For example, as illustrated in FIG. 2(b), based on the distribution information about the received signal code power (RSCP) and the distribution information about the amount of the received energy per chip divided by the power density in the band (Ec/N0) at each lattice point which is obtained as a result of dividing, a coverage area of the wireless cell, and the strong signal area ratio and the average amount of radio interference of each wireless cell are calculated. The definition of the strong signal area ratio will be described later.

The results of the above calculation are stored in the network planning information storage section 604.

Incidentally, the radio quality calculation unit 603 can be omitted. If the radio qualities collected for each wireless cell can be acquired from the wireless network planning system 50 or the like, the radio qualities may be directly stored in the network planning information storage section 604.

The network planning information storage section 604 stores the network planning information collected by the network planning information collection unit 602 and the radio qualities of each wireless cell calculated by the radio quality calculation unit 603. For example, the network planning information illustrated in FIGS. 2(b) and 3 and the strong signal area ratio and the average amount of radio interference of each wireless cell illustrated in FIG. 6 are stored.

A quality abnormality analysis unit 605 estimates, based on the radio qualities, the reference value of the network statistical quality for each wireless cell and compares the estimated reference value and the actually measured value to analyze the potential abnormalities in quality of the wireless cell. The quality abnormality analysis unit 605 acquires the network statistical quality and the radio quality from the network statistical quality storage section 601 and the network planning information storage section 604, analyzes the abnormalities in quality of the wireless cell, and outputs the result of analysis to a quality display unit 606.

The quality display unit 606 reads out the analysis result from the quality abnormality analysis unit 605, and uses a display unit such as a display to display the quality state of the wireless cell along with the information stored in the network statistical quality storage section 601 and the network planning information storage section 604.

The example of the configuration of the first embodiment of the present invention has been described above. Since the wireless base stations 10 and 11, the wireless base station controller 20 and the mobile terminals 80 to 82 are well known among those skilled in the art and are not directly related to the present invention, the structures are not detailed here.

Figure 7:
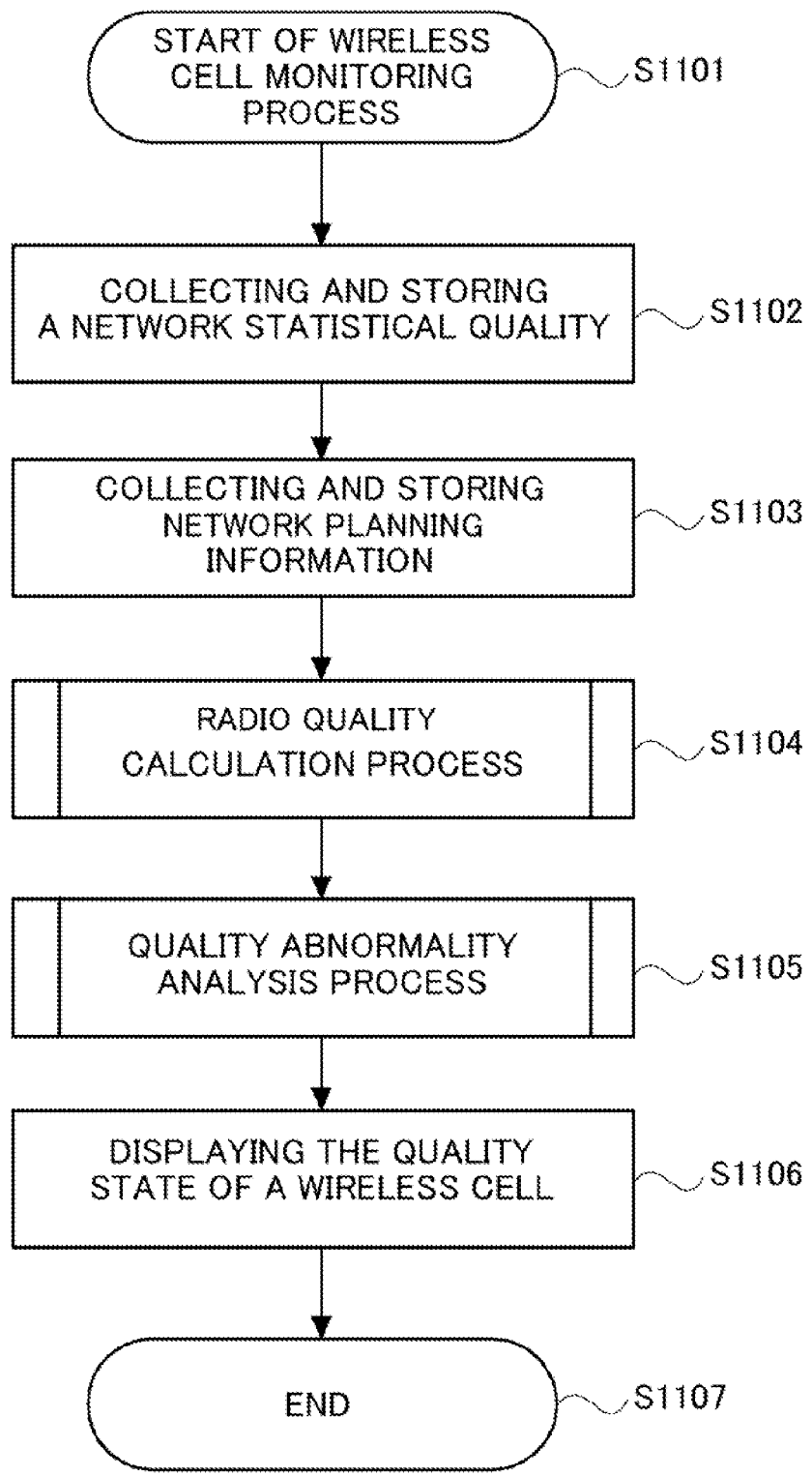
FIG. 7 A flowchart illustrating an example of the operation of a wireless cell monitoring system according to the first embodiment.

The following describes the operation of the wireless cell monitoring system 60 according to the present embodiment, with reference to a flowchart of FIG. 7.

When a wireless cell monitoring process starts at a predetermined timing (S1101), the network statistical quality collection unit 600 collects the measured value (the call setup success rate, the handover success rate, a call termination success rate, a packet transfer throughput, a packet loss rate or a packet transfer delay, for example) of the network statistical quality using the wireless base station controller 20 via the wired link 94, and stores the measured value in the network statistical quality storage section 601 (S1102). For example, the operations done at regular intervals or the operations done by a maintenance worker trigger the wireless cell monitoring process.

Figure 2:
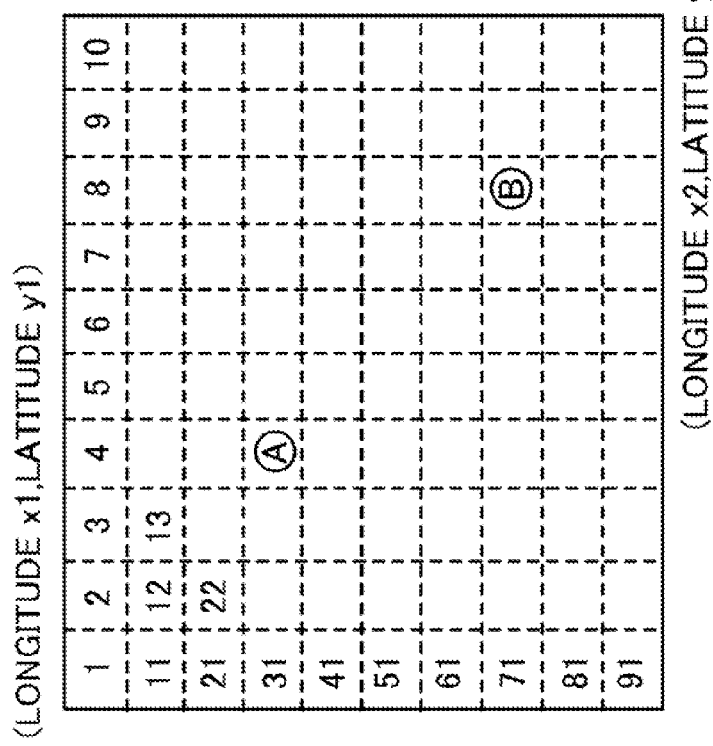
FIG. 2 A explanatory diagram illustrating an example of a radio quality kept by a wireless network planning system.

Then, the network planning information collection unit 602 collects the network planning information (the radio quality distribution of each wireless base station as illustrated in FIG. 2, for example) from the wireless network planning system 50 via the wired link 95, and stores the network planning information in the network planning information storage section 604 (S1103). Then, the radio quality calculation unit 603 reads out the network planning information from the network planning information storage section 604, calculates the radio quality of each wireless cell (the strong signal area ratio and the average amount of radio interference, for example), and stores the radio quality in the network planning information storage section 604 (S1104).

Figure 8:
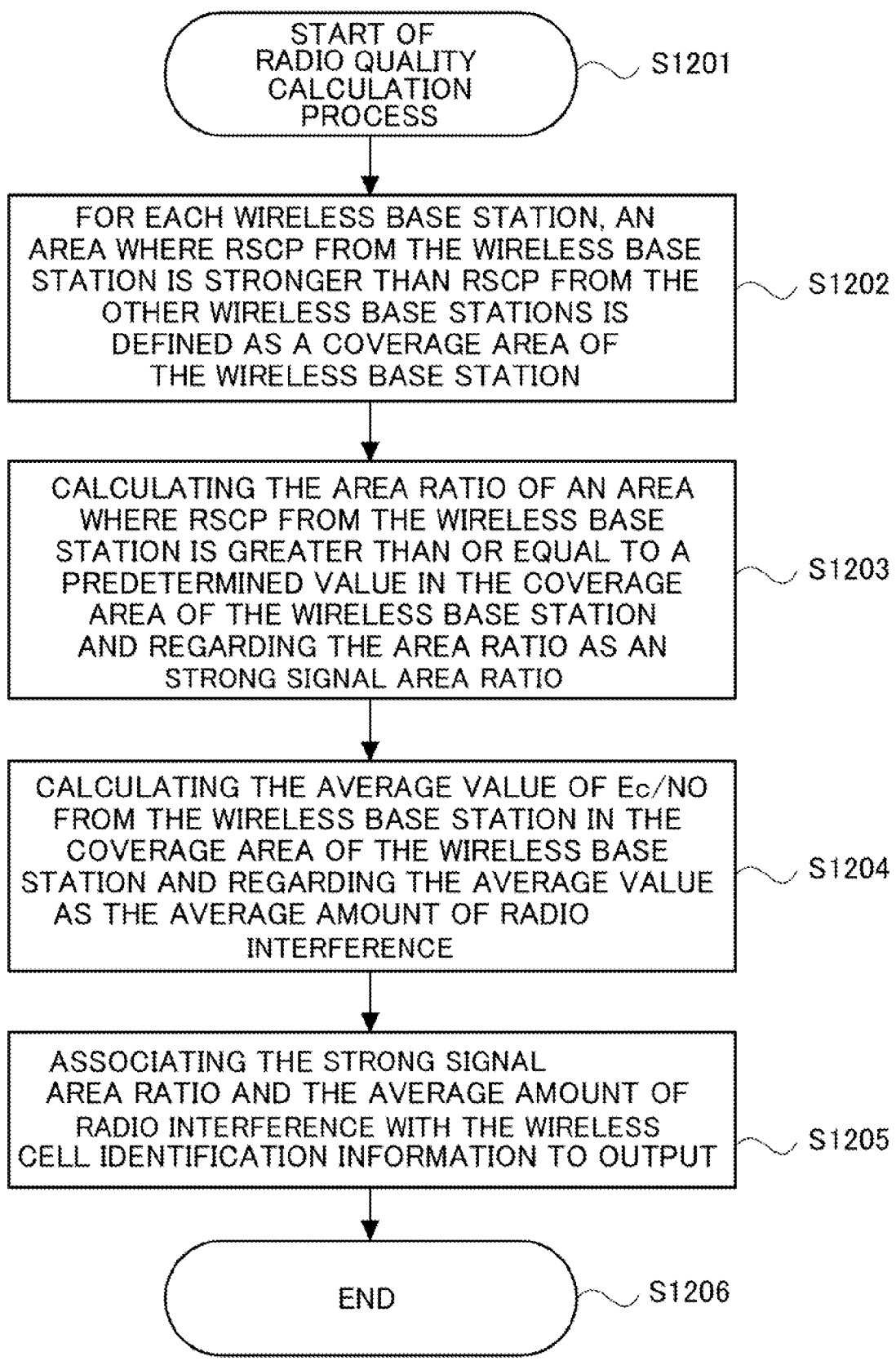
FIG. 8 A flowchart illustrating an example of the operation of a radio quality calculation unit according to the first embodiment.

Also referring to FIG. 8, an example of the operation of a radio quality calculation process by the radio quality calculation unit 603 will be described.

When the radio quality calculation process starts (S1201 in FIG. 8), an area where the received signal code power (RSCP) from a certain wireless base station is stronger than the received signal code powers (RSCP) from the other wireless base stations is defined as a coverage area (s1) of the certain wireless base station. In this manner, the coverage area is defined for each wireless base station (S1202 in FIG. 8). Then, the area (s2) where the received signal code power (RSCP) from the wireless base station is greater than or equal to a predetermined threshold in the coverage area of the wireless base station is calculated, and the ratio of the calculated size of s2 to the calculated size of s1 is regarded as the strong signal area ratio (S1203 in FIG. 8). Subsequently, the average value of the received energy per chip divided by the power density in the band (Ec/N0) from the wireless base station in the coverage area of the wireless base station is calculated and regarded as the average amount of radio interference (S1204 in FIG. 8). Then, the strong signal area ratio and the average amount of radio interference are associated with the wireless cell identification information on a per wireless base station basis, and then output to the network planning information storage section 604 (S1205 in FIG. 8). Then, the process ends (S1206 in FIG. 8). Incidentally, only one of the calculation of the strong signal area ratio (S1203) and the calculation of the average amount of radio interference (S1204) may be performed.

Then, the quality abnormality analysis unit 605 analyzes the abnormalities in quality of the wireless cell based on the information stored in the network statistical quality storage section 601 and the network planning information storage section 604 (S1105).

Also referring to FIG. 9, the operation of a quality abnormality analysis process by the quality abnormality analysis unit 605 will be described.

Figure 9:
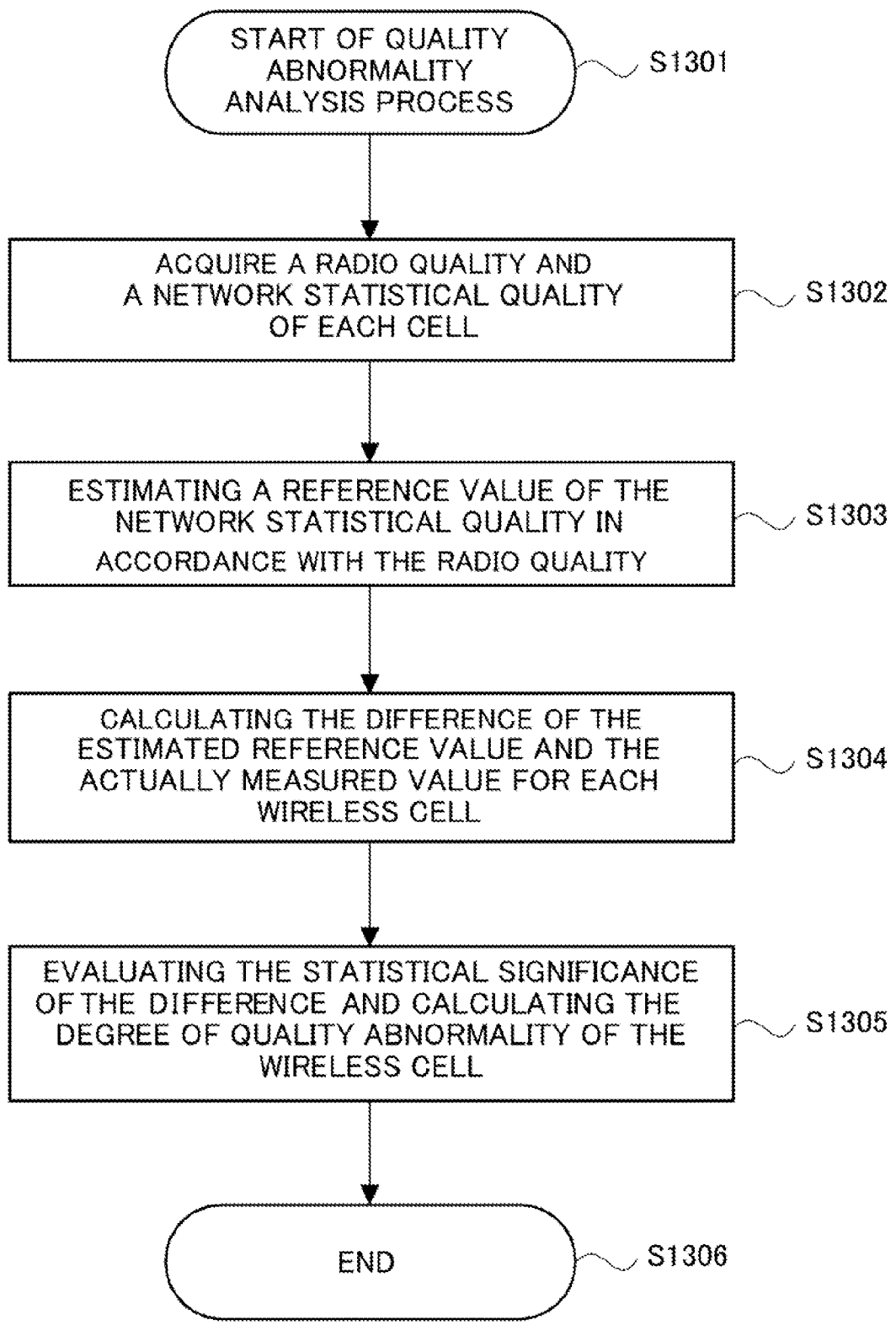
FIG. 9 A flowchart illustrating an example of the operation of a quality abnormality analysis unit according to the first embodiment.

When the quality abnormality analysis process starts at a predetermined timing (S1301 in FIG. 9), the measured network statistical quality and the calculated radio quality of each wireless cell are respectively acquired from the network statistical quality storage section 601 and the network planning information storage section 604 (S1302 in FIG. 9). In the case described below, an indicator of the network statistical quality is the call setup success rate, and an indicator of the radio quality is the strong signal area ratio.

Then, based on many pairs of the values of the strong signal area ratio and the call setup success rate acquired on a per wireless cell basis, the value of the call setup success rate that can be expected in accordance with the value of the strong signal area ratio is statistically estimated, and the estimated value is regarded as a reference value of the call setup success rate (S1303 in FIG. 9). That is, for each wireless cell, a pair of the calculated strong signal area ratio and the measured call setup success rate is created, and many pairs are accumulated (for many wireless cells). Based on the pairs, the correlation (a linear regression equation, for example) between the strong signal area ratio and the call setup success rate is calculated.

The reason why the measured value of the call setup success rate (including that of a malfunctioning wireless cell) can be input to calculate the correlation is that many samples are prepared.

Moreover, the effect of the temporary deterioration in quality caused by a malfunctioning device or the like can be eliminated by calculating the long-term average of the network statistical quality. The objective of the present invention is not to detect the temporary deterioration in quality caused by a malfunctioning device or the like but to detect a wireless cell that constantly demonstrates lower performance as compared with the expected quality. Moreover, the temporary deterioration in quality can be excluded in advance by a conventional quality monitoring method (the comparison with the past statistical average value, for example).

In one example, when a multivariate analysis, which is for example a regression analysis, is used, a regression equation to the reference value of the call setup success rate from the strong signal area ratio can be calculated with the strong signal area ratio and the call setup success rate being set as a explanatory variable s and a objective variable p, respectively. That is, when the linear regression equation is used, with the use of the appropriately set coefficients a and b, the correlation between the strong signal area ratio and the reference value of the call setup success rate can be expressed as follows:

$$p = a*s + b$$

Moreover, in another example, the strong signal area ratio is discretized at predetermined intervals. Based on a pair of the average value of the strong signal area ratio which is calculated for each discretization segment and the average value of the call setup success rate, the correlation between the strong signal area ratio and the reference value of the call setup success rate can be expressed.

Then, for each wireless cell, the difference between the reference value of the call setup success rate that can be expected in accordance with the value of the strong signal area ratio of the wireless cell and the measured value of the call setup success rate of the wireless cell is calculated (S1304 in FIG. 9). That is, the difference represents a gap between the quality that the wireless cell is expected to demonstrate and the actual quality.

If the correlation between the network statistical quality and the radio quality is weak, the variance of the difference which is calculated for each wireless cell increases. Therefore, it is difficult to appropriately evaluate the abnormalities in quality of the wireless cells by simply comparing the differences. To solve the problem, the statistical significance of the calculated difference is evaluated, and the degree of quality abnormality (the degree of gap) is calculated as a barometer of the statistical significance (S1305 in FIG. 9). For example, in the case of regression analysis, a standard residual obtained by normalizing the difference using a standard deviation thereof, and the like can be used as the degree of quality abnormality. In one example, the difference is normalized with the standard deviation; the difference is generally normalized based on the degree of statistical reliability of the correlation. Incidentally, a predetermined threshold may be set for the difference or the degree of quality abnormality; only the wireless cells the quality abnormality of which exceed a predetermined limitation may be detected.

After the operations described above, the quality abnormality analysis process of the wireless cell ends (S1306 in FIG. 9).

According to another embodiment, a plurality of indicators of the radio quality are used for one indicator of the network statistical quality to analyze the quality abnormalities. For example, the indicator of the network statistical quality may be the call setup success rate, while the indicators of the radio quality may be the strong signal area ratio and the average amount of radio interference. In this way, using a plurality of indicators of the radio quality leads to the highly reliable analysis of the quality abnormalities for one indicator of the network statistical quality. Incidentally, in this case, the multivariate analysis such as the multiple regression analysis, and the like can be used to perform the same operations as those described above. Therefore, the operations are not detailed here.

Then, the quality display unit 606 displays, based on the result of analysis by the quality abnormality analysis unit 605, the quality state of the wireless cell using a display unit (S1106).

Figure 11:
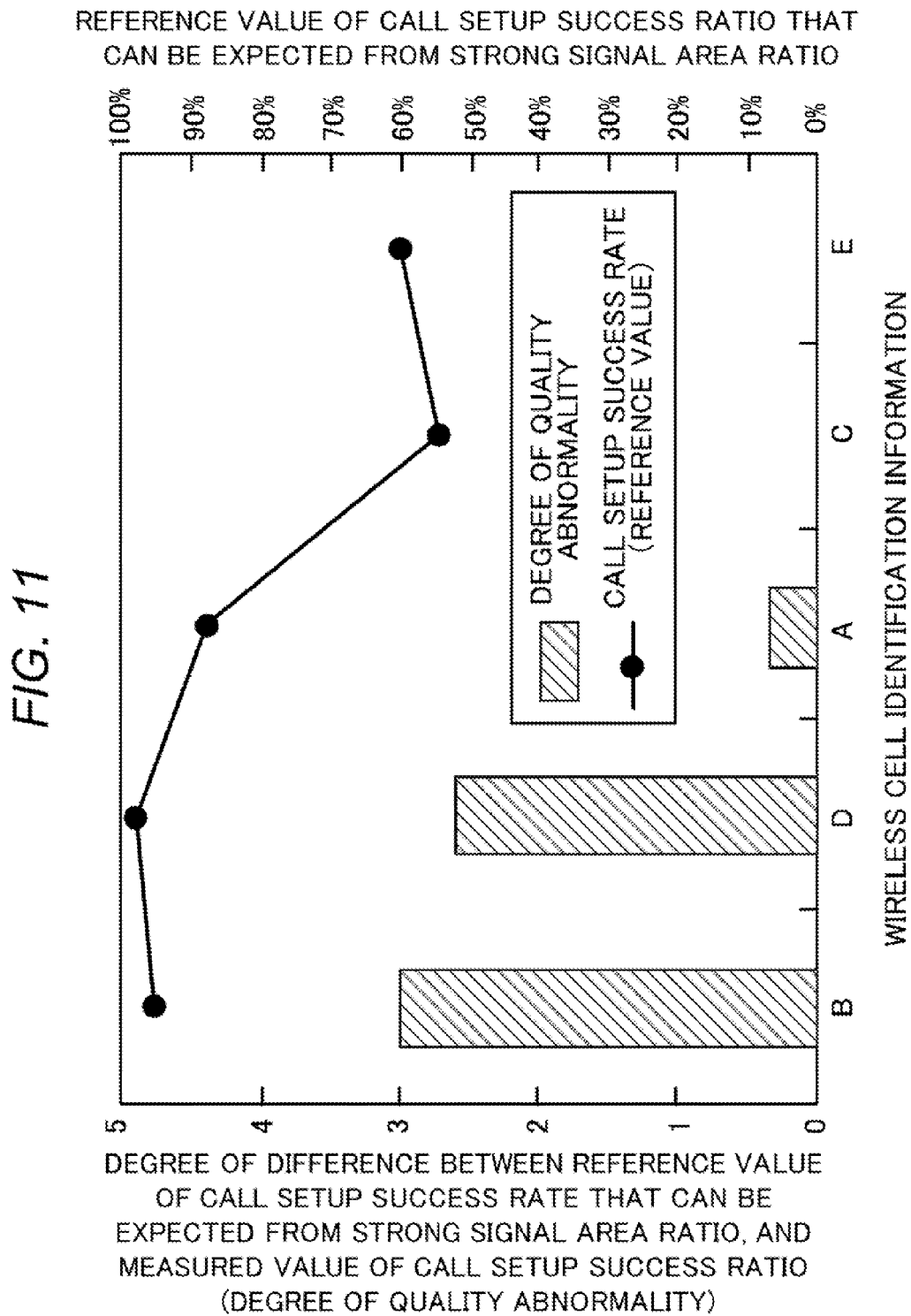
FIG. 11 An explanatory diagram illustrating an example of what the quality display unit displays.
Figure 12:
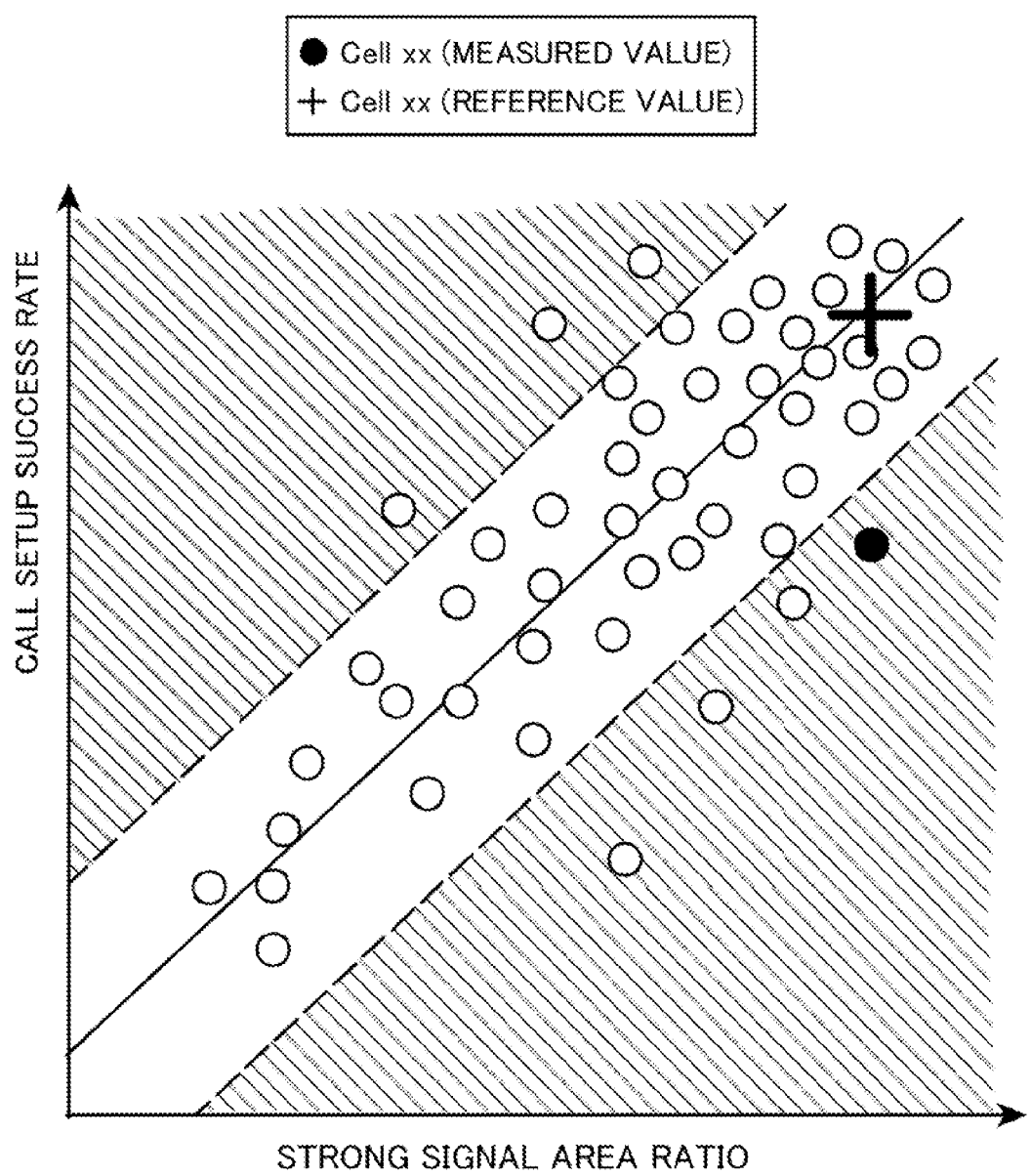
FIG. 12 An explanatory diagram illustrating an example of what the quality display unit displays.

FIGS. 10 to 12 show examples of how to display the quality state of the wireless cells. FIG. 10 is a table in which the wireless cell identification information, the strong signal area ratios, the reference values of the call setup success rates that can be expected from the strong signal area ratios, the measured values, and the degrees of quality abnormality are displayed; the quality state of each wireless cell is quantitatively listed. Moreover, FIG. 11 is a bar graph where the degrees of quality abnormality of the wireless cells are displayed from the highest to the lowest; the degree and distribution of quality abnormality of the wireless cell can be visually checked. FIG. 12 is a scatter diagram where the strong signal area ratios and the call setup success rates of the wireless cells are displayed; one dot corresponds to one wireless cell. In the scatter diagram of FIG. 12, the solid line represents a regression line from the strong signal area ratio to the reference value of the call setup success rate; a dashed line represents the threshold thereof. The quality state of a specific wireless cell can be checked in comparison with the overall trend.

Second Embodiment

According to a second embodiment of the present invention, the basic configuration thereof is the same as that of the first embodiment, but the quality abnormality analysis unit 605 can analyze the quality abnormalities of the wireless cell using a plurality of indicators of the network statistical quality.

In one embodiment, with the use of the weighted sum of the degrees of quality abnormality which is calculated for each indicator of the network statistical quality, the quality abnormalities of the wireless cell can be analyzed.

Figure 13:
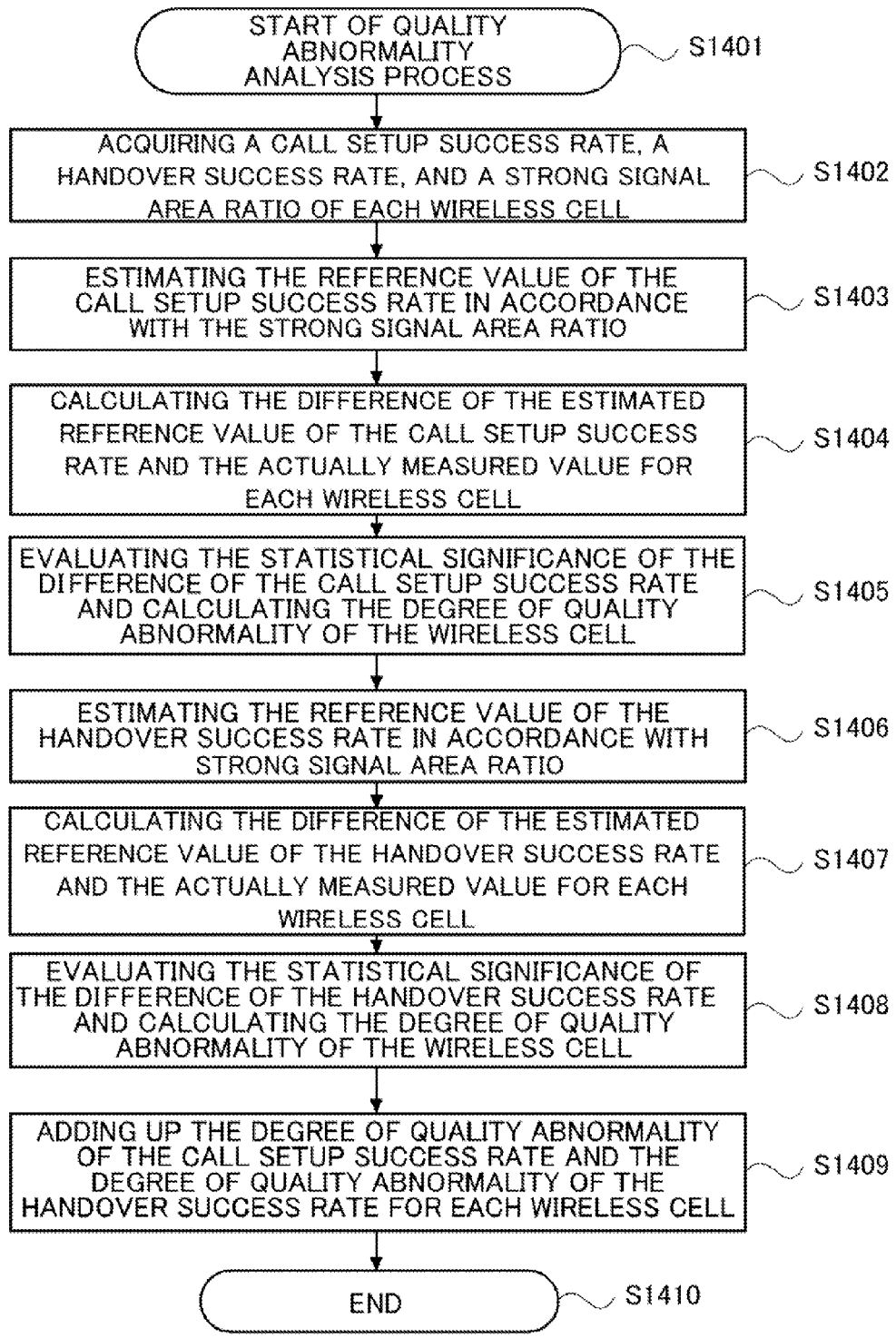
FIG. 13 A flowchart illustrating an example of the operation of a quality abnormality analysis unit according to a second embodiment of the present invention.

FIG. 13 is a flowchart illustrating one example of the operation of the present embodiment. In FIG. 13, the call setup success rate and the handover success rate are used as the indicators of the network statistical quality; the strong signal area ratio is used as the indicator of the radio quality.

The operations of S1403 to S1405 and S1406 to S1408 in FIG. 13 are the same as those of S1303 to S1305 of the operation flow (FIG. 9) of the first embodiment. The difference between the present embodiment and the first embodiment is that a plurality of indicators of the network statistical quality are acquired (S1402) and the weighted sum of the degrees of quality abnormality is calculated for each indicator of the network statistical quality (S1409).

In that manner, the quality abnormalities of the wireless cell are analyzed based on a plurality of indicators of the network statistical quality. Therefore, the quality abnormalities of the wireless cell are comprehensively determined.

Third Embodiment

Figure 14:
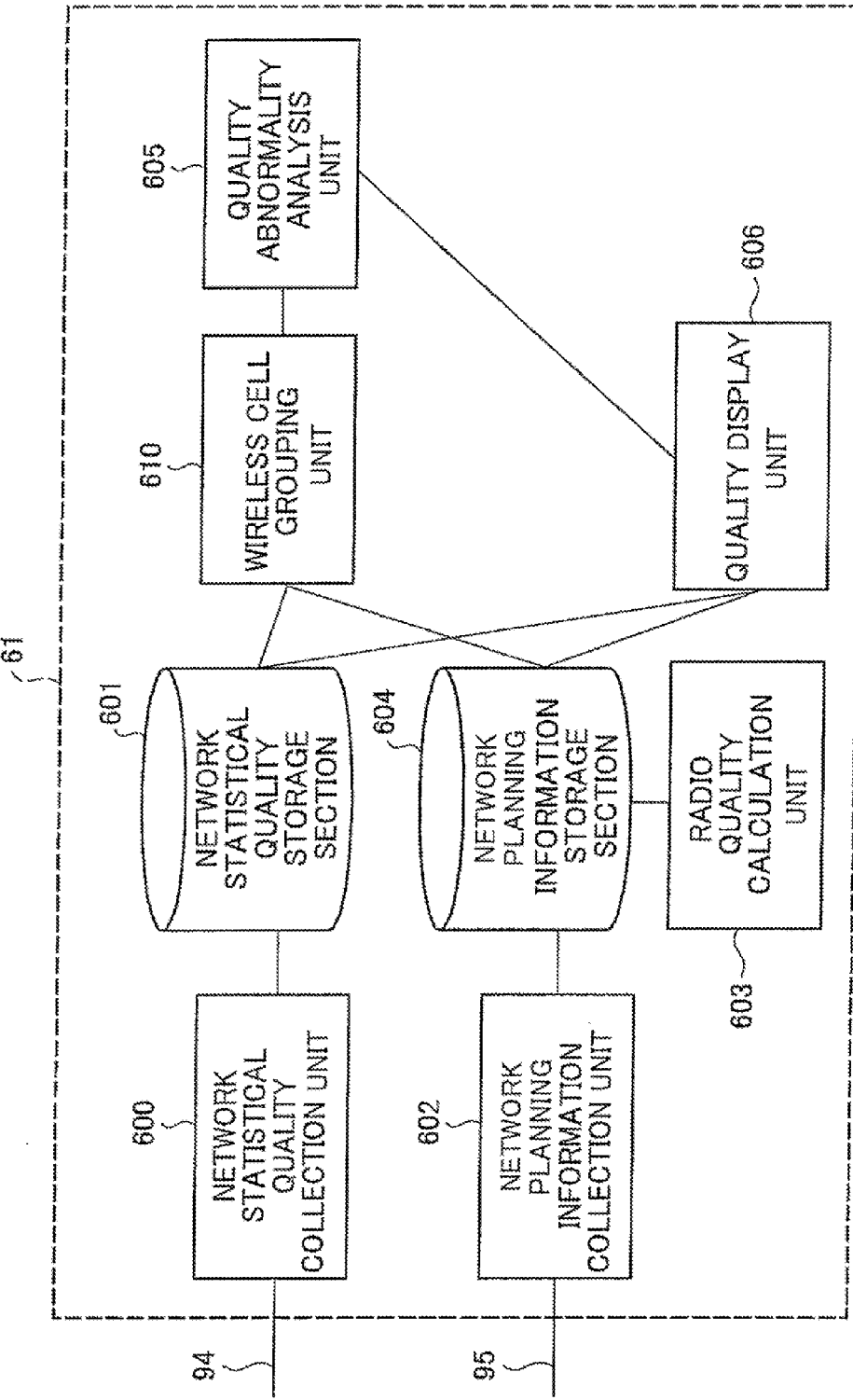
FIG. 14 A diagram illustrating the configuration of a wireless cell monitoring system according to a third embodiment of the present invention.

The configuration of a third embodiment of the present invention will be described. FIG. 14 is a block diagram illustrating an example of the configuration of a wireless cell monitoring system 61 according to the third embodiment. The wireless cell monitoring system 61 of the third embodiment is different from the wireless cell monitoring system 60 of the first embodiment: The wireless cell monitoring system 61 includes a wireless cell grouping unit 610. The same components as those of the first embodiment have been designated by the same reference numbers, and are not detailed here.

The wireless cell grouping unit 610 groups, based on the information acquired from the network statistical quality storage section 601 and the network planning information storage section 604, the wireless cells in accordance with a predetermined criterion. In one embodiment, grouping is carried out based on information about where the wireless cell is installed such as information about the wireless cell is installed in a suburban area, a subway or a building, information about what type the wireless base station is, and the like. Such pieces of information can be usually acquired from the wireless network planning system 50. The information on groups of wireless cells, which are grouped by the wireless cell grouping unit 610, are, on group by group basis, output to the quality abnormality analysis unit 605 which then performs the analysis process of the quality abnormalities.

The following describes the operation of the above-described example of configuration.

Figure 15:
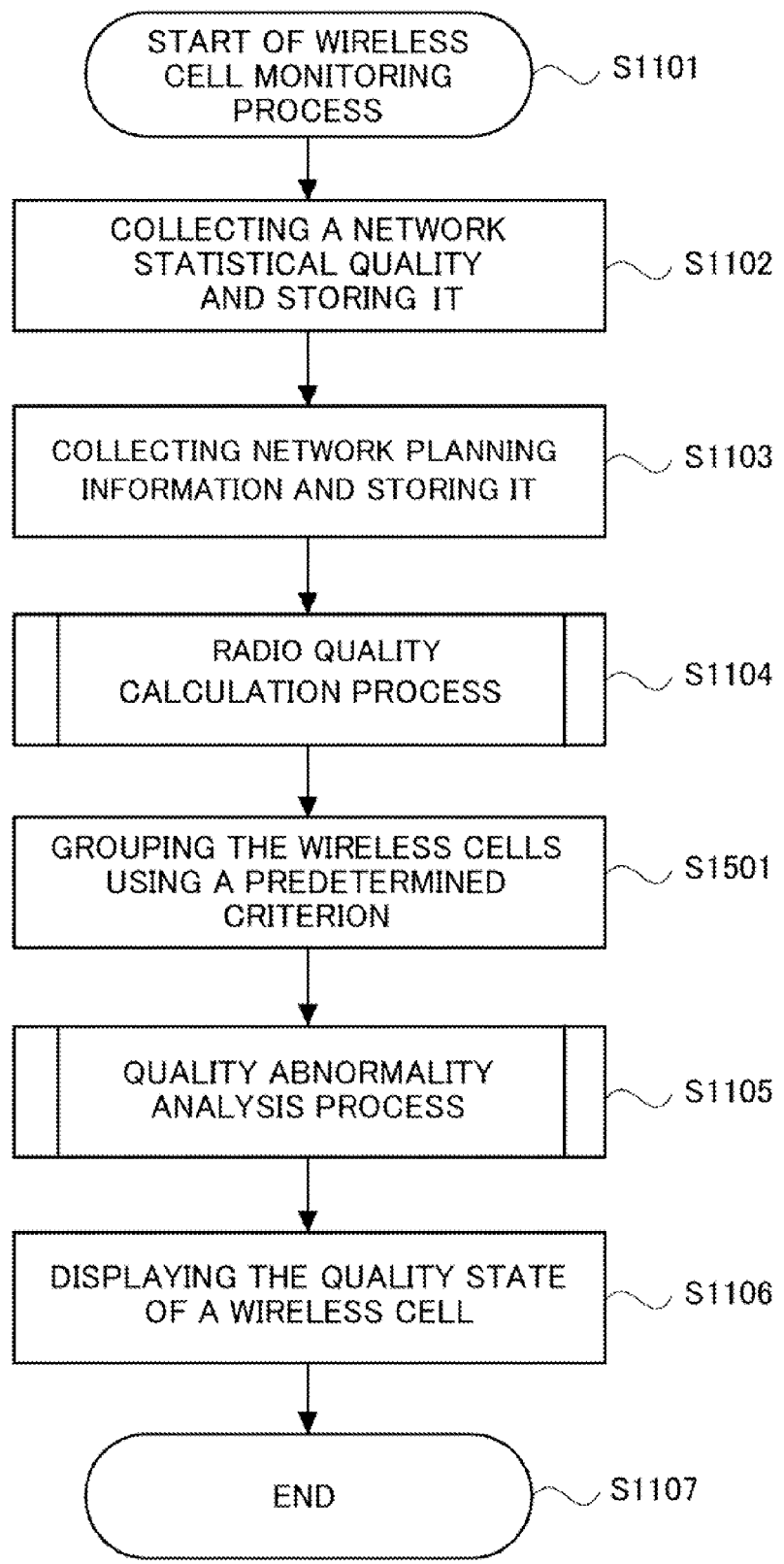
FIG. 15 A flowchart illustrating an example of the operation of a wireless cell monitoring system according to the third embodiment.

FIG. 15 is a flowchart illustrating an example of the operation of the example of the configuration of the third embodiment. The same operations as those of the first embodiment have been designated by the same reference symbols as those of FIG. 7, and are not detailed here.

The difference between the first and third embodiments is that the wireless cells are grouped with the predetermined criterion before the quality abnormality analysis process (S1501). That is, as described above, the wireless cell grouping unit 610 groups the wireless cells in accordance with the predetermined criterion, and the analysis of the quality abnormalities of the wireless cells is carried out by the quality abnormality analysis unit 605 for each group. Since the quality abnormality analysis process of the wireless cells can be performed in the same way as in the first and second embodiments, the quality abnormality analysis process is not detailed here.

In one embodiment, grouping is carried out according to where the wireless cell is installed: The wireless cell may be installed in a suburban area, a subway, or a building (the name of the building where the wireless cell is installed, for example). A mobile carrier usually sets a different planning policy in accordance with type of the installation place of the wireless cell whose communication traffic characteristic and radio propagation characteristic are different from those of the other. If the wireless cells are not grouped, then the wireless cells with different characteristics exist together. Therefore, it is difficult to obtain the proper result of the analysis process of the quality abnormalities. According to the present embodiment, this problem is prevented. Since the wireless cells having same planning policies are grouped and handled on group by group basis, the accuracy of the quality abnormality analysis process increases.

Incidentally, the wireless cell monitoring system shown in FIG. 4 may be configured hardware, software or a combination of both. The software, i.e., computer program, is read out from a computer readable medium, such as a hard disk drive and CD-ROM, by CPU of a computer and executed by the CPU to have the computer function as each component of the wireless cell monitoring system.

While representative embodiments of the present invention have been described in detail above, various changes, substitutions, and alternatives may be made without departing from the spirit and scope of the invention as defined by the appended claims. Moreover, even if the claims are changed at the time of filing the application, the inventor intends that the scope of the appended claims or the equivalents thereof be maintained.

INDUSTRIAL APPLICABILITY

The present invention can be applied to a mobile communication network based on a cellular communication system.

The invention claimed is:
1. A wireless cell monitoring method comprising:
a step of calculating one or more radio qualities for each coverage area of wireless cells;
a step of measuring one or more network statistical qualities for each coverage area of the wireless cells;
a step of making a pair of each network statistical quality and one or more radio qualities for each coverage area of each wireless cell; and
a step of calculating, based on the pairs of each network statistical quality and one or more radio qualities for the coverage areas of the wireless cells, a regression analysis between each network statistical quality and one or more radio qualities,
wherein the radio qualities are based on different indicators from those of the network statistical qualities.

2. The wireless cell monitoring method according to claim 1, further comprising:
- a step of comparing the regression analysis with the pair of one network statistical quality and one or more radio qualities for the coverage area of each wireless cell and determining that the wireless cell whose pair of one network statistical quality and one or more radio qualities is apart from the regression analysis by more than a predetermined value is abnormal.

3. The wireless cell monitoring method according to claim 2,
- wherein a determination as to whether the pair of one network statistical quality and one or more radio qualities is apart from the regression analysis by more than a predetermined value is made based on the degree of the apartness normalized based on the degree of statistical reliability of the regression analysis.

4. The wireless cell monitoring method according to claim 1,
- wherein each network statistical quality is a call setup success rate, a handover success rate, a call termination success rate, a packet transfer throughput, a packet loss rate or a packet transfer delay.

5. The wireless cell monitoring method according to claim 1, further comprising:
- a step of comparing the regression analysis with the pair of the network statistical quality in the coverage area of each wireless cell and one or more radio qualities for a plurality of the network statistical qualities and determining that the wireless cell whose weighted sum of the degrees, each of which is the degree of the apartness of the pair of the network statistical quality and one or more radio qualities, with respect to a plurality of the network statistical qualities, is apart from a predetermined criterion by more than a predetermined value is abnormal.

6. The wireless cell monitoring method according to claim 5,
- wherein the degree of the apartness of the pair of each network statistical quality and one or more radio qualities is the degree of the apartness normalized based on the degree of statistical reliability.

7. The wireless cell monitoring method according to claim 5,
- wherein each network statistical quality is a call setup success rate, a handover success rate, a call termination success rate, a packet transfer throughput, a packet loss rate or a packet transfer delay.

8. The wireless cell monitoring method according to claim 1,
- wherein the one or more radio qualities are a strong signal area ratio calculated from a received signal code power (RSCP) distribution, the average amount of radio interference calculated from a received energy per chip divided by the power density in the band (Ec/N0) distribution, or both of them.

9. The wireless cell monitoring method according to claim 1,
- wherein the wireless cells belonging to a same classification group are used as a plurality of wireless cells the regression analysis of which is to be calculated.

10. A wireless cell monitoring device comprising:
- a unit for calculating one or more radio qualities for each coverage area of wireless cells;
- a unit for measuring one or more network statistical qualities for each coverage area of the wireless cells;
- a unit for making a pair of each network statistical quality and one or more radio qualities for each coverage area of each wireless cell; and
- a unit for calculating, based on the pairs of each network statistical quality and one or more radio qualities for the coverage areas of the wireless cells, a regression analysis between each network statistical quality and one or more radio qualities,
- wherein the radio qualities are based on different indicators from those of the network statistical qualities.

11. The wireless cell monitoring device according to claim 10, further comprising
- a unit for comparing the regression analysis with the pair of one network statistical quality and one or more radio qualities for the coverage area of each wireless cell and determining that the wireless cell whose pair of one network statistical quality and one or more radio qualities is apart from the regression analysis by more than a predetermined value is abnormal.

12. The wireless cell monitoring device according to claim 11,
- wherein a determination as to whether the pair of one network statistical quality and one or more radio qualities is apart from the regression analysis by more than a predetermined value is made based on the degree of the apartness normalized based on the degree of statistical reliability of the regression analysis.

13. The wireless cell monitoring device according to claim 10,
- wherein each network statistical quality is a call setup success rate, a handover success rate, a call termination success rate, a packet transfer throughput, a packet loss rate or a packet transfer delay.

14. The wireless cell monitoring device according to claim 10, further comprising
- a unit for comparing the regression analysis with the pair of the network statistical quality in the coverage area of each wireless cell and one or more radio qualities for a plurality of the network statistical qualities and determining that the wireless cell whose weighted sum of the degrees, each of which is the degree of the apartness of the pair of the network statistical quality and one or more radio qualities, with respect to a plurality of the network statistical qualities, is apart from a predetermined criterion by more than a predetermined value is abnormal.

15. The wireless cell monitoring device according to claim 14,
- wherein the degree of the apartness of the pair of each network statistical quality and one or more radio qualities is the degree of the apartness normalized based on the degree of statistical reliability.

16. The wireless cell monitoring device according to claim 14,
- wherein each network statistical quality is a call setup success rate, a handover success rate, a call termination success rate, a packet transfer throughput, a packet loss rate or a packet transfer delay.

17. The wireless cell monitoring device according to claim 10,
- wherein the one or more radio qualities are a strong signal area ratio calculated from a received signal code power (RSCP) distribution, the average amount of radio interference calculated from a received energy per chip divided by the power density in the band (Ec/N0) distribution, or both of them.

18. The wireless cell monitoring device according to claim 10,
wherein the wireless cells belonging to a same classification group are used as a plurality of wireless cells the regression analysis of which is to be calculated.

19. A non-transitory computer program product, embodied on a computer readable medium, that causes a computer to function as a wireless cell monitoring device comprising:
a unit for calculating one or more radio qualities for each coverage area of wireless cells;
a unit for measuring one or more network statistical qualities for each coverage area of the wireless cells;
a unit for making a pair of each network statistical quality and one or more radio qualities for each coverage area of each wireless cell; and
a unit for calculating, based on the pairs of each network statistical quality and one or more radio qualities for the coverage areas of the wireless cells, a regression analysis between each network statistical quality and one or more radio qualities,
wherein the radio qualities are based on different indicators from those of the network statistical qualities.

20. The non-transitory computer program product according to claim 19, wherein the wireless cell monitoring device further comprising
a unit for comparing the regression analysis with the pair of one network statistical quality and one or more radio qualities for the coverage area of each wireless cell and determining that the wireless cell whose pair of one network statistical quality and one or more radio qualities is apart from the regression analysis by more than a predetermined value is abnormal.

21. The non-transitory computer program product according to claim 20,
wherein a determination as to whether the pair of one network statistical quality and one or more radio qualities is apart from the regression analysis by more than a predetermined value is made based on the degree of the apartness normalized based on the degree of statistical reliability of the regression analysis.

22. The non-transitory computer program product according to claim 19,
wherein each network statistical quality is a call setup success rate, a handover success rate, a call termination success rate, a packet transfer throughput, a packet loss rate or a packet transfer delay.

23. The non-transitory computer program product according to claim 19, wherein the wireless cell monitoring device further comprising
a unit for comparing the regression analysis with the pair of the network statistical quality in the coverage area of each wireless cell and one or more radio qualities for a plurality of the network statistical qualities and determining that the wireless cell whose weighted sum of the degrees, each of which is the degree of the apartness of the pair of the network statistical quality and one or more radio qualities, with respect to a plurality of the network statistical qualities, is apart from a predetermined criterion by more than a predetermined value is abnormal.

24. The computer program product according to claim 23, wherein the degree of the apartness of the pair of each network statistical quality and one or more radio qualities is the degree of the apartness normalized based on the degree of statistical reliability.

25. The computer program product according to claim 23, wherein each network statistical quality is a call setup success rate, a handover success rate, a call termination success rate, a packet transfer throughput, a packet loss rate or a packet transfer delay.

26. The computer program product according to claim 19, wherein the one or more radio qualities are a strong signal area ratio calculated from a received signal code power (RSCP) distribution, the average amount of radio interference calculated from a received energy per chip divided by the power density in the band (Ec/N0) distribution, or both of them.

27. The non-transitory computer program product according to claim 19,
wherein the wireless cells belonging to the same classification group are used as a plurality of wireless cells the regression analysis of which is to be calculated.

\* \* \* \* \*